UNITED STATES PATENT OFFICE.

THE AMERICAN WATERPROOF FABRIC COMPANY, OF NEW YORK, N. Y., ASSIGNEES, BY MESNE ASSIGNMENTS, OF JOHN B. WANDS, OF MEMPHIS, TENNESSEE.

IMPROVED FABRIC FOR ROOFING, BELTING, &c.

Specification forming part of Letters Patent No. 29,423, dated July 31, 1860; Reissue No. 1,369, dated January 6, 1863.

*To all whom it may concern:*

Be it known that JOHN B. WANDS, of Memphis, in the county of Shelby and State of Tennessee, did invent a new and Improved Fabric Suitable for Covering Roofs, for Machine-Belting, Hose, and for other Purposes; and I do hereby declare that the following is a full, clear, and exact description of the same.

The said improved fabric consists of canvas or other fibrous goods saturated with what is known to manufacturers of stearic acid as "residuary gum"—that is to say, the residuary pitchy matter resulting from the manufacture of such acid. It is a flexible water-proof fabric, and may be used with good effect for all the purposes for which flexible water-proof goods are required. It is very durable, and may be cheaply produced.

This fabric may be made by passing woven goods through the gum while the latter is kept in a melted state by heat, and afterward pressing it between rollers to force the melted gum into or between the fibers, and take off any excess from its surface. The goods may be of any width and thickness, according to the purpose for which the fabric is to be used, and when hose is to be made the goods should be woven double—that is to say, in tubular form.

The apparatus employed in the manufacture of this fabric may be variously constructed; but I will briefly describe that which I have employed with success. The vessel in which the saturation with the gum is effected consists of a pan or boiler of semi-cylindrical form, arranged horizontally in a suitable setting of masonry, with a fire-place below it. Within and near the bottom of the said vessel, entirely submerged in the gum, there is arranged a pair of horizontal rollers, between which the goods pass from a horizontal guide-roller arranged near one side of the vessel. From these rollers the goods pass up to a pair of rollers above the vessel, and from thence over a horizontal table to another pair of rollers, from whence they pass to a take-up roller, on which they are rolled up. As the goods pass over the horizontal table, I can, if desired, sprinkle them with sand and powdered soapstone, or with soapstone alone, according to the purpose for which the fabric is intended. If it is intended for covering roofs, I sprinkle it over first with a layer of sand and then with a layer of soapstone; but for hose and belting I only use the soapstone, the object of the sand being to give hardness to the fabric, and the object of the soapstone being mainly to prevent the layers of the fabric from sticking together when rolled up or folded. When the addition of the soapstone or of the sand and soapstone is made, the last pair of rollers press it into the gum to make it combine therewith and lay smoothly on the fabric, which is then ready for immediate use.

Any other approved apparatus for effectively saturating goods with fluid or semi-fluid matter—as the machinery employed in the rubber manufacture—may be used in lieu of the above.

I am aware that the residuary gum herein mentioned has been heretofore proposed to be employed in conjunction with other substances for covering floor-cloths, paper, and other non-flexible or but slightly flexible material; but I am not aware that any have been able to produce a fabric therewith adapted to serve the purpose of rubber goods. I do not claim, broadly, the use of this gum; neither do I limit myself to the means described for effecting the incorporation of the gum; but,

Having now fully described the invention, I claim as a new article of manufacture, invented by J. B. WANDS—

The within-described flexible fabric, composed of canvas or other fibrous goods saturated with the residuary gum of stearic acid, as herein set forth.

M. D. FIELD,
*Presdt. of the American Waterproof Fabric Co.*

Witnesses:
THOMAS D. STETSON,
GEORGE F. STETSON.